US012343717B2

(12) United States Patent
Esfehanian et al.

(10) Patent No.: US 12,343,717 B2
(45) Date of Patent: Jul. 1, 2025

(54) INJECTION DEVICE FOR DISCHARGING A GAS, PROCESS GAS SYSTEM FOR SUPPLYING A PROCESS GAS, AND DEVICE AND METHOD FOR THE THERMAL OR THERMO-CHEMICAL TREATMENT OF MATERIAL

(71) Applicant: ONEJOON GMBH, Bovenden (DE)

(72) Inventors: Arian Esfehanian, Böblingen (DE); Daniel Hipp, Reutlingen (DE)

(73) Assignee: ONEJOON GMBH, Bovenden (DE)

( * ) Notice: Subject to any disclaimer, the term of this patent is extended or adjusted under 35 U.S.C. 154(b) by 518 days.

(21) Appl. No.: 17/416,373

(22) PCT Filed: Dec. 18, 2019

(86) PCT No.: PCT/EP2019/085911
§ 371 (c)(1),
(2) Date: Jun. 18, 2021

(87) PCT Pub. No.: WO2020/127460
PCT Pub. Date: Jun. 25, 2020

(65) Prior Publication Data
US 2022/0072496 A1 Mar. 10, 2022

(30) Foreign Application Priority Data

Dec. 21, 2018 (DE) ...................... 10 2018 133 362.5

(51) Int. Cl.
*B01J 6/00* (2006.01)
*B01J 4/00* (2006.01)
(Continued)

(52) U.S. Cl.
CPC ............... *B01J 6/004* (2013.01); *F27B 9/045* (2013.01); *F27B 9/3005* (2013.01); *F27D 2007/023* (2013.01)

(58) Field of Classification Search
CPC ...... F27B 9/045; F27B 9/3005; F27B 9/3011; F27B 9/3016; B01J 6/001; B01J 6/004;
(Continued)

(56) References Cited

U.S. PATENT DOCUMENTS 3,932,116 A 1/1976 Hansen
6,793,966 B2 9/2004 Warnes et al.
(Continued)

FOREIGN PATENT DOCUMENTS

CN 101370576 A 2/2009
CN 102089071 A 6/2011
(Continued)

OTHER PUBLICATIONS

Moll M, DE-102016125060-A1 and translation (Year: 2018).*
(Continued)

*Primary Examiner* — Steven S Anderson, II
(74) *Attorney, Agent, or Firm* — Lempia Summerfield Katz LLC

(57) ABSTRACT

Injection device (56) for discharging a gas (54), in particular a process gas (54), onto a material (12), in particular onto a battery cathode material (14) that is to be calcined, having at least one inlet (58) through which the gas (54) can be supplied to the injection device (56), and at least one outlet (60) through which the gas (54) can be discharged from the injection device (56), the inlet and outlet being connected to one another by a flow path (62) for the gas (54). According to the invention, the flow path (62) has a heat exchanger (64) with a heat exchanger housing (68) which is accessible from the outside for an ambient atmosphere (66) and in which a duct arrangement (70) is integrated. The duct arrangement (70) comprises a first flow duct (72.1) and a second flow duct (72.2) between which there is formed a redirection region (74.1) such that the gas (54) can flow through the first and
(Continued)

second flow duct (72.1, 72.2) in different main flow directions. The invention further relates to a process gas system (52) for supplying a gas (54) and to a device (10) and a method for the thermal or thermo-chemical treatment of material.

25 Claims, 7 Drawing Sheets

(51) Int. Cl.
*F27B 9/04* (2006.01)
*F27B 9/30* (2006.01)
*F27D 7/02* (2006.01)

(58) Field of Classification Search
CPC .......... F22D 1/36; F22D 1/38; F28D 1/05333; F28D 1/05341; F28D 7/1623; F28D 7/1646; F28D 7/1692; F28D 7/1661; F28D 7/1607; F28D 7/1638
See application file for complete search history.

(56) References Cited

U.S. PATENT DOCUMENTS

| | | | |
|---|---|---|---|
| 6,911,234 B2 | 6/2005 | Warnes et al. | |
| 7,939,028 B2 | 5/2011 | Ohashi et al. | |
| 8,460,624 B2 | 6/2013 | Missalla et al. | |
| 8,840,862 B2 | 9/2014 | Ohashi et al. | |
| 10,670,264 B2 | 6/2020 | Lepez et al. | |
| 2003/0049374 A1 | 3/2003 | Warnes et al. | |
| 2005/0000439 A1 | 1/2005 | Warnes et al. | |
| 2009/0060826 A1 | 3/2009 | Ohashi et al. | |
| 2011/0150750 A1 | 6/2011 | Goecke et al. | |
| 2011/0189078 A1 | 8/2011 | Ohashi et al. | |
| 2012/0052000 A1 | 3/2012 | Missalla et al. | |
| 2012/0076936 A1 | 3/2012 | Hirano | |
| 2016/0161116 A1* | 6/2016 | Strobel | F23L 15/04 431/215 |
| 2018/0134963 A1 | 5/2018 | Lepez et al. | |
| 2018/0135854 A1 | 5/2018 | Lepez et al. | |
| 2019/0316842 A1 | 10/2019 | Moll et al. | |
| 2020/0269205 A1 | 8/2020 | Esfehanian et al. | |

FOREIGN PATENT DOCUMENTS

| | | | |
|---|---|---|---|
| CN | 102317202 A | 1/2012 | |
| CN | 102997651 A | 3/2013 | |
| CN | 107921394 A | 4/2018 | |
| CN | 111372674 A | 7/2020 | |
| DE | 3436906 A1 | 7/1986 | |
| DE | 10241964 A1 | 3/2003 | |
| DE | 112012003485 T5 | 5/2014 | |
| DE | 102016125060 A1 * | 6/2018 | ............. F26B 15/14 |
| DE | 102017121224 A1 | 3/2019 | |
| EP | 1136777 A1 * | 9/2001 | ............ F27B 9/3011 |
| EP | 3203162 A1 | 8/2017 | |
| GB | 1414879 A | 11/1975 | |
| JP | S5584534 A | 6/1980 | |
| JP | 2003322474 A | 11/2003 | |
| JP | 2012225620 A | 11/2012 | |
| WO | 2014017729 A1 | 1/2014 | |
| WO | 2014203733 A1 | 12/2014 | |

OTHER PUBLICATIONS

EP1136777 and translation (Year: 2001).*
Search Report cited in corresponding German application No. 10 2018 133 362.5; Oct. 21, 2019; 9 pp.
Office Action cited in Chinese patent application No. 201980085072.1; Feb. 14, 2023; 15 pp.
International Search Report and Written Opinion cited in corresponding PCT app No. PCT/EP2019/085911; Mar. 3, 2020; 12pp.
Translation of the Office Action cited in Japanese patent application No. 2021-535616; Jan. 23, 2024; 7 pp.

* cited by examiner

_US 12,343,717 B2_

INJECTION DEVICE FOR DISCHARGING A GAS, PROCESS GAS SYSTEM FOR SUPPLYING A PROCESS GAS, AND DEVICE AND METHOD FOR THE THERMAL OR THERMO-CHEMICAL TREATMENT OF MATERIAL

RELATED APPLICATION DATA

This application is a U.S. national stage of and claims priority to prior filed international application no. PCT/EP2019/085911 filed Dec. 18, 2019 and which claims priority to German national application no. 10 2018 133 362.5 filed Dec. 21, 2018. The entire contents of these prior filed applications are hereby incorporated by reference herein.

BACKGROUND OF THE INVENTION

1. Field of the Invention

The invention relates to an injection device for supplying a gas, a process gas system for introducing a process gas and an apparatus and also a process for the thermal or thermo-chemical treatment, in particular calcination, of material, in particular battery cathode material.

2. Description of the Prior Art

With the assistance of such apparatuses and such a process, a calcination of a pulverulent cathode material is carried out in a specific atmosphere, in particular in an inert or oxygen-containing atmosphere, in a furnace, for example in the production of lithium ion batteries.

A pulverulent cathode material is, for example, a lithium-containing transition metal precursor which is calcined in the furnace to give a lithium-transition metal oxide. In this procedure, water ($H_2O$) or carbon dioxide ($CO_2$) is liberated as offgas from the lithium-containing transition metal precursor, depending on whether lithium hydroxide or lithium carbonate precursors are used.

To maintain the oxygen-containing atmosphere, fresh process gas is introduced into the process space and the water ($H_2O$) or carbon dioxide ($CO_2$) formed is removed from the combustion space by continuous or intermittent extraction of the process space atmosphere. The extraction results in the formation of spaces having a lower gas partial pressure, which likewise makes the continuous introduction of further fresh process gas necessary.

In principle, however, such apparatuses and processes are also used for the thermal treatment of other materials which can be, for example, workpieces which have to be thermally or thermochemically treated correspondingly in the presence of a process gas.

The temperatures in such furnaces can be up to 2000° C. Furthermore, the invention will be illustrated for the example of the thermal treatment of cathode material as mentioned above. The temperature in the calcination of such materials depends in a manner known per se on the material to be treated and the type of furnace used.

In the case of apparatuses known from the market and processes for calcining material, the process gas which is blown into the process space mixes on its way to the material to be treated with the atmosphere which is already present in the process space. This mixed gas which ultimately arrives at the material therefore contains firstly the process gas in a reduced concentration and secondly, inter alia, offgas which is already present in the process space atmosphere. The effect of the process gas on the material to be treated can therefore be influenced only in a not very satisfactory manner and monitoring and control of the atmosphere prevailing at the material is possible only to a limited extent.

In such treatments, it is also necessary to keep the temperature level in the process space of the furnace constant. In order to ensure this, the process gas has to be appropriately heated to the temperature prevailing in the process space. In general, this heating of the process gas occurs actively, i.e. with consumption of energy required for producing the heat, by means of heating units. The actively heated process gas is then conveyed at the place of treatment in, on and in a vicinal region around the battery cathode material by means of, for example, a gas flow produced by a blower in gas conduits which are largely present outside the furnace but sometimes also in the furnace wall. In order to avoid loss of heat energy, costly and complicated measures for insulating the gas conduit present outside the furnace are necessary.

However, the temperature of the process gas fed in is generally considerably lower than the temperature of the process space atmosphere. The process gas fed in is frequently not sufficiently heated before reaching the material to be treated or loses heat energy on the way to the material, so that incomplete reactions can result. In addition, the cooler process gas can take up heat from the material carriers or other components of the transport system, which can result in thermal stresses which can lead to greater wear and possibly premature failure of components and constituents of the furnace.

SUMMARY OF THE INVENTION

It is therefore an object of the invention to provide an injection device for supplying a gas, a process gas system for introducing a process gas and an apparatus and also a process for thermal or thermochemical treatment, which counter the abovementioned disadvantages of the prior art and optimally transfer heat present in the process space passively and in an energy-efficient manner to the gas/process gas.

This object is achieved according to the invention by an injection device for supplying a gas, in particular a process gas, to a material, in particular to a battery cathode material to be calcined, comprising
  a) at least one inlet through which the gas can be fed to the injection device and at least one outlet through which the gas can be supplied from the injection device, which are connected to one another by a flow path for the gas;
  wherein
  b) the flow path has a heat exchanger having a heat exchanger housing which is accessible to an ambient atmosphere from the outside and in which a channel arrangement is accommodated;
  c) the channel arrangement comprises a first flow channel and a second flow channel between which a diversion region is formed in such a way that the gas can flow with different main flow directions through the first and second flow channels.

Such an injection device enables the heat of a process space atmosphere already present in a process space to be utilized effectively for heating the process gas, which leads overall to an improved total efficiency. For this purpose, the injection device is arranged in a furnace or the like in such a way that the process space atmosphere present flows around the heat exchanger housing, or the latter is at least surrounded by the process space atmosphere present, so that heat transfer is possible. The transfer of heat from the furnace atmosphere or from the furnace interior to the injection device is effected not only by flow but also and sometimes even predominantly by radiation. Even when there is no flow in the furnace, heat is transferred.

The heat exchanger housing can thus be arranged in a largely flow-free or even static process space atmosphere. Subsequently, it is assumed by way of example that a moving process space atmosphere flows around the heat exchanger housing.

Depending on the field of use, it can be advantageous for the at least one inlet and the at least one outlet to be arranged essentially with mirror symmetry or asymmetrically relative to an axis of symmetry.

In addition, it is advantageous for the channel arrangement to comprise a third flow channel in addition to the first and second flow channels, with a second diversion region being formed between the third and second flow channels so that the gas can flow with different main flow directions through the second and third flow channels. The flow channels preferably dictate a meandering flow path within the channel arrangement.

A meandering flow path can be present in the case of a two-dimensional S-flow path or else three-dimensional channel arrangements which, for example, dictate a coiled flow path in which the flow is diverted at least twice and the diversions occur in two planes which are at an angle to one another, in particular are perpendicular to one another.

For this purpose, the first and second, the first and third or the second and third flow channels advantageously define a common plane, where the third or the second or the first flow channel is offset relative to this plane or is arranged at an angle thereto. In such an arrangement of the flow channels, the gas flowing through the flow channels is diverted once within the defined plane and once from the defined plane into another plane, i.e., for example, to the left/right or upward/downward. Here, diversions at an angle of from 20° to 180° to the main flow direction in the respective flow channel are preferred. A diversion through 180°, for example, brings about a change in the main flow direction to a direction opposite to the main flow direction of the preceding flow channel.

It is advantageous for the channel arrangement to comprise one or more further flow channels and in each case a diversion region in front of each further flow channel so that the gas can flow with different main flow directions through two successive flow channels, in addition to the three flow channels.

In this way, an available construction space, for example in a housing, can be utilized efficiently. With the housing otherwise unchanged, the necessary reduction of the flow cross sections firstly leads to an increase in the contact area for the gas and secondly to an increase in the flow velocity of the gas, which together increase the heat energy transferred to the gas flow per distance covered.

In order to increase the efficiency of heat transfer from the heat exchanger to the gas flowing through it further, it is advantageous for a core structure to be present in one or more flow channels. These core structures increase a heat transfer area with which the gas flowing through the flow channels interacts thermally compared to the heat transfer area of the flow channels without core structures. The core structures can be arranged on the flow guide elements or on an interior surface of the heat exchanger housing. However, they can also be arranged in such a way that they form an annular space for the gas in the flow channels. In the case of such an arrangement, the core structures can preferably be joined at the end to the interior surfaces of the heat exchanger housing.

It can be advantageous here for the core structures to be solid core bodies. However, it can also be advantageous for core bodies to have flow openings so that the gas flowing through the flow channels likewise flows through the flow openings and thus can take up heat energy not only on outer surfaces of the core bodies.

As regards the core bodies, it is also advantageous for these to have, at least in sections in the flow direction, a cross section which is circular, elliptical, has the shape of a segment of a circle, has the shape of a sector of a circle, is polygonal, in particular triangular, quadrilateral, in particular trapeze-shaped, trapezoidal or rectangular, pentagonal, hexagonal or has more than six sides. The core bodies can have, at otherwise essentially the same volume of the flow channels, indentations and/or raised regions to bring about a further increase in the heat transfer area participating in heat transfer. These indentations and/or raised regions can be present regularly or irregularly on the core bodies.

In an advantageous embodiment, at least two flow channels run parallel to one another. Furthermore, the heat exchanger and/or one or more of the flow channels can, at least in sections, have a cross section which is circular, elliptical, has the shape of a segment of a circle, has the shape of a sector of a circle, is polygonal, in particular triangular, quadrilateral, in particular trapeze-shaped, trapezoidal or rectangular, pentagonal, hexagonal or has more than six sides.

Here, one or more of the flow channels can have cross sections which alter in terms of cross-sectional shape and/or in cross-sectional area in the respective main flow direction, at least in sections.

For as much as possible of the heat energy taken up by the heat exchanger to be able to be transferred to the gas to be heated, it is advantageous for the heat exchanger housing and wall of the flow channels present therein to be composed of one or more particularly thermally conductive materials. The material or materials preferably have a specific thermal conductivity of $\lambda \geq 50$ $Wm^{-1}K^{-1}$, preferably $\lambda \geq 75$ $Wm^{-1}K^{-1}$ and particularly preferably $\lambda \geq 100$ $Wm^{-1}K^{-1}$.

Particularly suitable materials for this purpose are, for example, materials which have a metal content, for example elemental metals, metal alloys, metal oxides, metal nitrides or metal carbides. The metal content can advantageously comprise copper (Cu), tin (Sb), zinc (Zn), silver (Ag), magnesium (Mg), nickel (Ni), beryllium (Be), aluminum (Al), potassium (K), molybdenum (Mo), tungsten (W), sodium (Na), iron (Fe), silicon (Si) and tantalum (Ta). Heat exchangers comprising, in particular, silicon carbide (SiC) and copper alloys are suitable for the injection device of the invention because of their high thermal conductivity. Especially at temperatures above 400° C., the heat exchanger comprises predominantly metal-ceramic materials. In any case, use is made of materials from which no metal or metal compounds which could contaminate the material to be calcined are liberated at the prevailing temperatures.

Furthermore, it can also be advantageous for the channel arrangement to be able to be formed at least partly by a flow guide structure which can be inserted into the heat exchanger housing and be detachably fastened therein. A flow guide structure can here be formed, for example, by joining flow guide elements. An advantage of this type of construction is that the heat exchanger housing can, for example, be provided as hollow body and the flow guide structure for forming the channel arrangement can be inserted into this before assembly of the injection device. Detachably fastening of the flow guide structure makes it possible for a user to adapt the distance which has to be covered by the gas within the heat exchanger to the requirements of the particular production step.

It is advantageous for the heat exchanger housing to comprise housing caps which, in particular, provide parts of the channel arrangement. In this case, part of the heat exchanger and the channel arrangement can be made in one piece, for example as extruded profile or rolled profile. The heat exchanger is then completed by the housing caps. As an alternative, a separate flow guide structure can also be inserted into the heat exchanger housing with housing caps taken off and these caps are then put in place.

It is advantageous for the housing caps to define the diversion regions.

In a particularly preferred embodiment, the injection device comprises a nozzle arrangement having one or more injection nozzles by means of which the gas can be supplied in a direction toward the material to be treated.

The nozzle arrangement can be a component independent of the heat exchanger or else can be encompassed by the heat exchanger.

In a process gas system according to the invention for introducing a process gas, in particular a process gas for a thermal or thermochemical treatment, in particular a calcination, of material, in particular of battery cathode material, into a process space, the abovementioned object is achieved by the process gas system using at least one injection device according to the invention which has at least some of the features indicated above for the injection device.

In an apparatus for the thermal or thermochemical treatment, in particular calcination, of material, in particular battery cathode material, comprising
 a) a housing;
 b) a process space present in the housing;
 c) a transport system by means of which the material or carrier structures laden with the material can be transported in a transport direction in or through the process space;
 d) a heating system by means of which a process space atmosphere prevailing in the process space can be heated, and
 e) a process gas system by means of which a process gas which is necessary for the thermal or thermochemical treatment of the material can be fed into the process space,
the abovementioned object is achieved by
 f) the process gas system being a process gas system of this type and the process gas being able to be supplied in a targeted manner by means of the injection device to the material or to the carrier structures laden with material;
 g) the injection device being arranged in such a way that the process space atmosphere can flow around and/or radiate heat onto the heat exchanger so that the process gas can be passively heated.

In a process for the thermal or thermochemical treatment, in particular calcination, of material, in particular battery cathode material, in which
 a) the material or the carrier structures laden with the material are conveyed through a process space of an apparatus for the thermal treatment of the material;
 b) a process space atmosphere prevailing in the process space is heated, and c) a process gas which is necessary for the thermal or thermochemical treatment is introduced into the process space,
the abovementioned object is achieved by
 d) the process gas being heated by means of a heat exchanger which is arranged in the process space.

The process gas can preferably be fed to the process space with a temperature which corresponds essentially to the temperature of the process space atmosphere.

Furthermore, preference is given in the process to using the abovementioned apparatus for the thermal or thermochemical treatment of material.

BRIEF DESCRIPTION OF THE DRAWINGS

Working examples of the invention will be illustrated below with the aid of the drawings. The drawings show.

DESCRIPTION OF PREFERRED WORKING EXAMPLES

Figure 1:
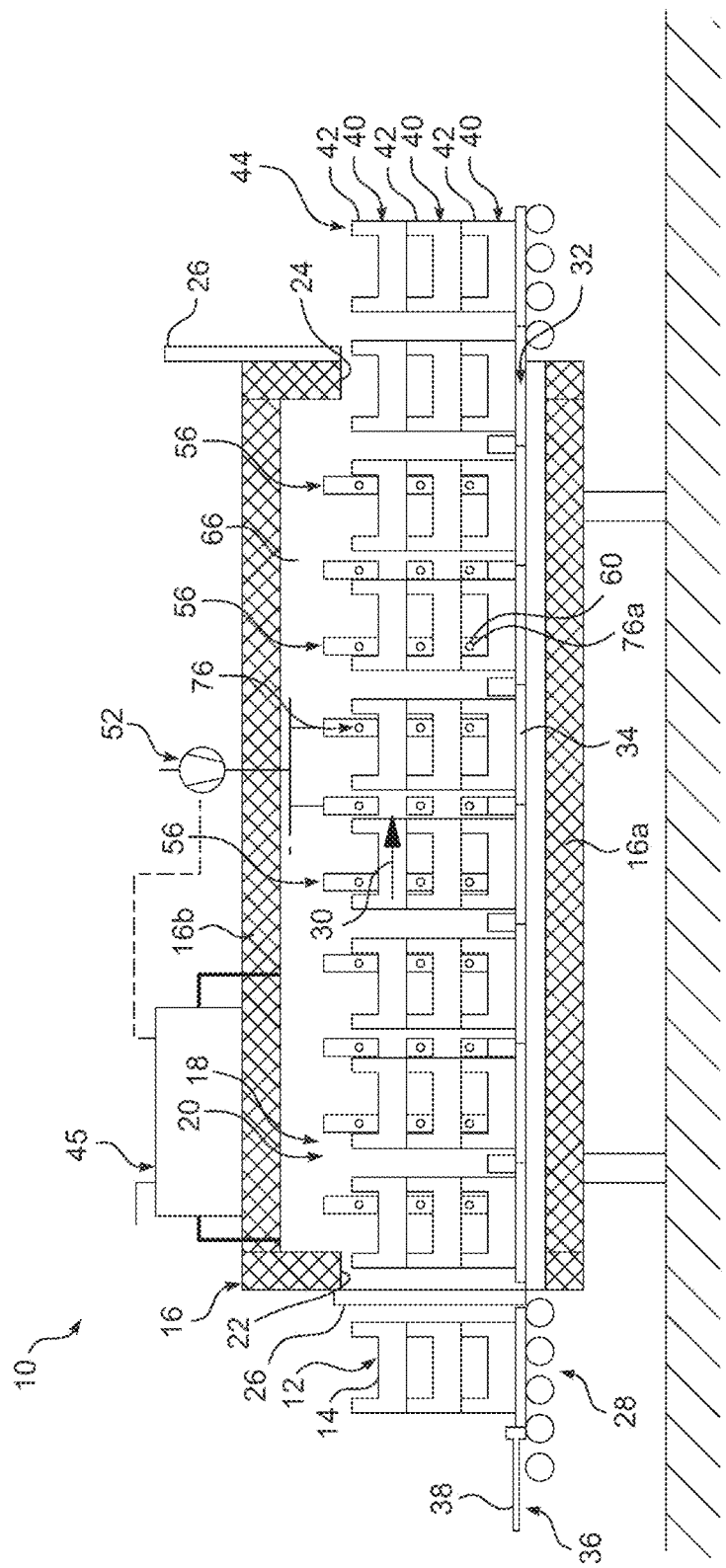
FIG. 1 a longitudinal section through an apparatus for the thermal or thermochemical treatment of material, comprising a process gas system by means of which a process gas is introduced through injection devices into a process space.
Figure 2A:
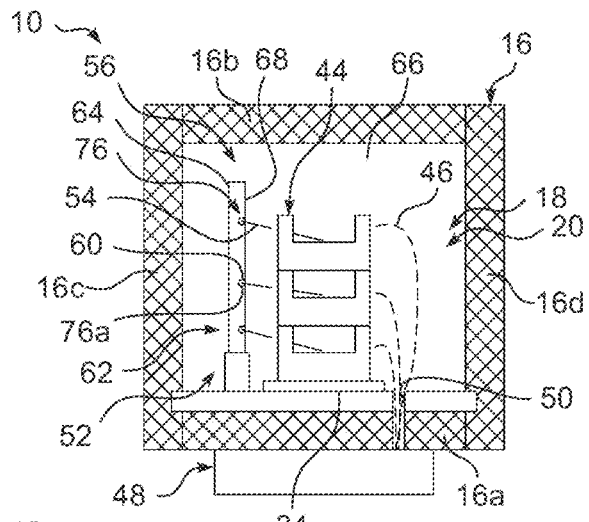
FIGS. 2a to 2c cross sections of the apparatus of FIG. 1 with in each case a working example of an injection device, in each of which a heat exchanger is arranged in the process space.
Figure 2B:
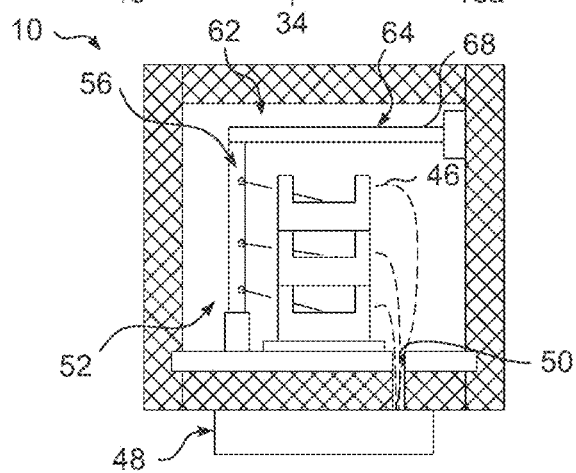
Figure 2C:
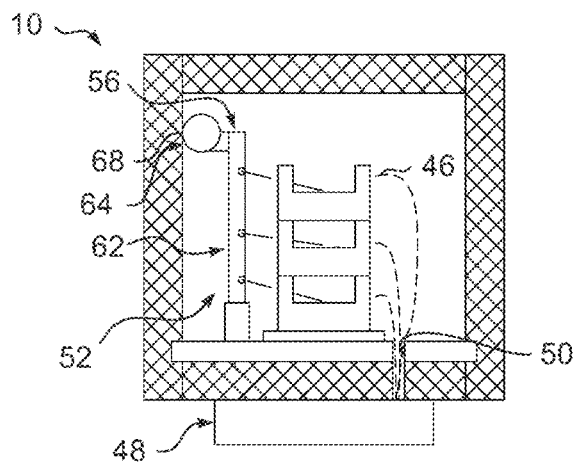

Firstly, reference is made to FIGS. 1 to 2c. In these, 10 denotes an apparatus for the thermal or thermochemical treatment of material 12. In the following, this apparatus 10 will in the interests of simplicity be referred to as furnace 10. In FIGS. 2a to 2c, not all components and constituents which have been labeled in FIG. 1 are in the interests of clarity not provided again with a reference numeral.

The material 12 can be, for example, a battery cathode material 14 as indicated at the outset which has to be calcined by means of a thermal treatment in the furnace 10 in the production of batteries.

The furnace 10 comprises a housing 16 with a bottom 16a, a top 16b and two vertical sidewalls 16c and 16d which bounds an interior space 18 in which a process space 20 is located. The housing 16 thus forms the housing of the process space 20. The interior space 18 of the furnace 10 can optionally be defined by a separate housing surrounding the housing 16. As can be seen in FIG. 1, the process space 20 extends between an inlet 22 and an outlet 24 of the housing 16, which can each be closed by a gate 26. As an alternative, an open inlet 22 and an open outlet 24 or else, in contrast thereto, in each case a gastight double gate lock by means of which separation of the atmosphere in the furnace from the surrounding atmosphere is ensured can also be present.

The material 12 is conveyed through the process space 20 in a transport direction 30 by means of a transport system 28; the transport direction 30 is indicated only in FIG. 1 by an arrow. In the present working example, the furnace 10 is designed as continuous furnace and specifically as pusher-type furnace in which the transport system 28 conveys the material 12 through the furnace 10. For this purpose, the transport system 28 has a transport track 32 along which a plurality of support trays 34 are pushed, as is known per se. In FIG. 1, only one support tray is provided with a reference numeral.

The transport system 28 comprises a pusher device 36 with a powered pusher punch 38 which pushes a support tray 34 from the outside through the inlet 22 into the process space 20. This support tray 34 pushes against the first support tray 34 in the transport direction 30, which is already in the process space 20, as a result of which all support trays 34 present in the process space 20 are pushed along by one position and the last support tray 34 in the transport direction 30 is pushed through the outlet 24 out from the process space 20.

In modifications which are not shown individually, other designs known per se for continuous furnaces are also possible. Mention may merely be made by way of example at this juncture of roller furnaces, conveying belt furnaces, chain transport furnaces, continuous travel furnaces and the like. As an alternative, the furnace 10 can also be configured as batch furnace which has only an inlet through which the material 12 can be transported into the process space 20 and out from this again. In this case, individual batches of the material 12 are introduced through this inlet in the transport direction 30 into the process space 20, thermally treated, then taken out again from the process space 20 through the entrance in the direction opposite to the transport direction 30 and in this way transported overall through the process space 20.

The material 12 can, depending on its nature, be conveyed as such by means of the transport system 28 and be placed, for example, directly on the support trays 34. This is, for example, possible when the material 12 is structural workpieces.

In the present working example, carrier structures 40, which in the case of the battery cathode material 14 are configured as firing dishes 42, laden with the material 12 are provided; these are in English terminology referred to as saggars. These carrier structures 40 can be placed on top of one another in a manner known per se to form a regular transport rack 44 having a plurality of levels, with in the present working example in each case three carrier structures 40 laden with battery cathode material 14 forming a transport rack 44 and in each case a support tray 34 carrying such a transport rack 44. Two or more than three, for example four, five, six or more, levels per transport rack 44 are also conceivable; the number of possible levels depends largely on the construction height of the process space 20 and the carrier structures 40. In one modification, the transport rack 44 is a separate component, for example made of metal or ceramic, which accommodates the carrier structures 40 in a plurality of levels.

The furnace 10 comprises a heating system 45 which is known from the market and is indicated purely schematically and only in FIG. 1 and by means of which an atmosphere prevailing in the process space 20 can be heated. The atmosphere can be heated in a known manner by means of convection, electromagnetic heat radiation or heat diffusion. Exemplary heating systems can therefore comprise heat radiator elements, fan heating elements or the like which can be arranged in a distributed manner on or in the furnace bottom 16a, the furnace top 16b and/or one of the vertical sidewalls 16c, 16d and/or in the process space 20. As an alternative or in addition, a convection heating system by means of which the furnace atmosphere is drawn from the process space 20, heated by means of a heating unit and blown back into the process space 20 is possible.

The thermal treatment of materials 12 can result in formation of an offgas 46 which has to be extracted from the process space 20. Such an offgas 46 is indicated by broken lines in FIGS. 2a to 2c and provided with a reference numeral. In the calcination of battery cathode material 14, water ($H_2O$) or carbon dioxide ($CO_2$), for example, is formed as offgas 46. In addition, lithium (Li)-containing phases can be liberated.

In order to be able to remove offgas 46 from the process space 20, an extraction system 48 which can be seen in FIGS. 2a, 2b and 2c is present and comprises extraction openings 50 in the bottom 16a of the housing 16 via which the offgas 46 can be drawn from the process space 20. Components such as blowers, conduits, filters and the like which are also necessary and known per se for this purpose are not shown individually in the interests of clarity.

Materials 12 for the thermal treatment of which a process gas is necessary can be thermally treated in the furnace 10. In the case of the battery cathode material 14 which has been mentioned, oxygen ($O_2$), for example, is required for effective calcination and is blown in the form of conditioned air into the process space 20. In this case, air consequently forms such a process gas. The oxygen ($O_2$) present therein is reacted to form the metal oxide and water ($H_2O$) and carbon dioxide ($CO_2$) are formed. In other processes, other process gases may be necessary. In some processes, oxygen-enriched air or even pure oxygen are required, and the oxygen content of such process gases can be from 21% to 100%. An inert gas, for example a noble gas, can also be a process gas necessary for frictionless thermal or thermochemical treatment.

The furnace 10 therefore comprises a process gas system 52 by means of which a process gas 54 which is necessary for the thermal treatment can be introduced into the process space 20.

Figure 3A:
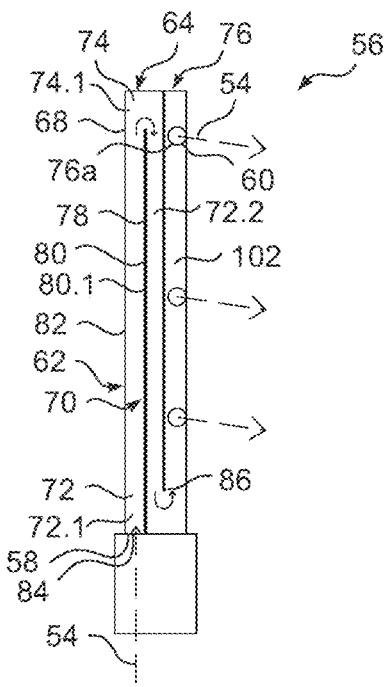
FIGS. 3a and 3b the injection devices of FIGS. 2a and 2b with in each case a partial section of the heat exchanger.
Figure 3B:
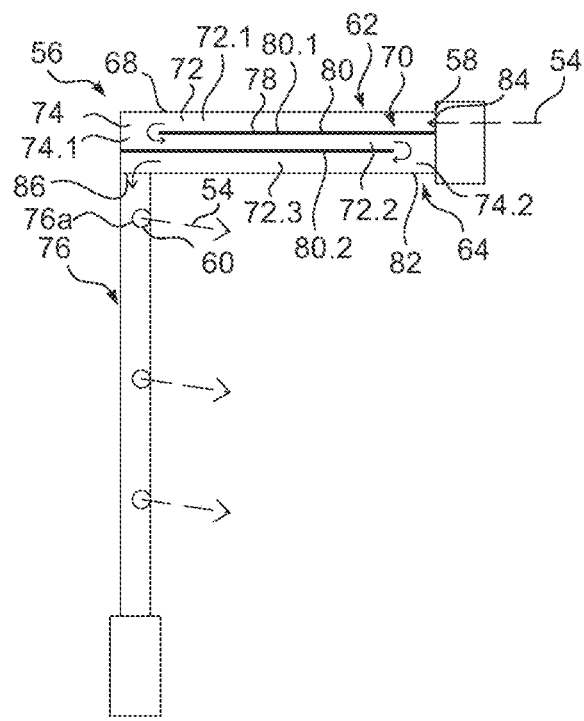

The process gas system 52 in turn comprises at least one injection device 56 which is shown schematically in FIGS. 3a and 3b and by means of which a gas, here the process gas 54, can be supplied to the material 12. FIG. 1 shows a plurality of injection devices 56, with only some being denoted by a reference numeral. The injection device 56 has an inlet 58 through which the process gas 54 can be introduced into the injection device and also at least one outlet 60 through which the process gas 54 can be discharged from the injection device 56, with the inlet 58 being depicted only in FIGS. 3a and 3b. The inlet 58 and the outlet or outlets 60 are fluidically connected to one another by a flow path 62 through which the process gas 54 can flow.

The flow path 62 comprises a heat exchanger 64 having a heat exchanger housing 68 which is accessible from the outside to an ambient atmosphere, here a process space atmosphere 66 prevailing in the process space 20, and which will in the following be referred to as HE housing 68. A channel arrangement 70 which comprises at least two flow channels 72 is accommodated in the HE housing 68.

The process gas 54 is heated by means of the heat exchanger 64 along the flow path 62 to the outlet 60 by the heat of the process space atmosphere 66 being utilized and transferred to the process gas 54.

FIG. 3a shows a channel arrangement 70 with two flow channels 72, namely a first flow channel 72.1 and a second flow channel 72.2; an injection device 56 configured in this way is also shown in FIG. 2a. FIG. 3b shows a channel arrangement 70 with three flow channels 72, in which a third flow channel 72.3 is also present; such injection devices 56 are also shown in FIGS. 2b and 2c, and this will be discussed further below. In the interests of clarity, identical components and constituents will continue not always to be provided individually with a reference numeral.

The process gas 54 can flow through the flow channels 72 and in variants which are not shown the flow channels are also configured as tube elements which are separately present within the HE housing 68. In the channel arrangement 70, a diversion region 74 is in each case formed between two successive flow channels 72 in the flow direction, so that the process gas 54 flows with different main flow directions through two successive flow channels 72. Specifically, a diversion region 74.1 is present between the first flow channel 72.1 and the second flow channel 72.2 and in the variant of FIG. 3b a second diversion region 74.2 is also present between the second flow channel 72.2 and the third flow channel 72.3.

For the purposes of the present invention, a diversion region 74 is any region in which the main flow direction of the process gas 54 is altered. The expression main flow direction is intended to indicate that turbulences or eddies which can occur in the flow channel 72 are disregarded when considering the flow direction of the process gas 54 through a flow channel 72. A diversion can be brought about, in particular, by abrupt changes in the course of the channel through the diversion region 74, for example by a U-shaped channel in the diversion region 74. If the main flow direction upstream of the diversion region 74 differs from the main flow direction downstream of the diversion region 74, oscillatory changes in the course of the channel can also be formed in a diversion region 74.

In order to be able to supply the process gas 54 to the material 12, the injection device 56 also has a nozzle arrangement 76 which comprises a plurality of injection nozzles 76a by means of which the process gas 54 can be supplied in a direction toward the material 12 to be treated. The nozzle arrangement 76 can here be integrated into the HE housing 68, as shown in FIG. 3a. The nozzle arrangement 76 can also be a separate unit, as can be seen in FIG. 3b.

The individual injection nozzles 76a can be formed by simple exit openings which can be configured, for example, as circular opening, oval opening or slit. The injection nozzles 76a can be movable, so that the outflow direction of the local process gas 54 supplied can be set individually for each injection nozzle 76a. This is not shown individually in the figures. Furthermore, the injection nozzles 76a can be arranged on the nozzle arrangement 76 at an angle to the bottom 16a and/or the transport direction 30 in order to supply the process gas 54 in a direction toward the firing dishes 42 and/or the material 12. Here, all injection nozzles 76a arranged on the nozzle arrangement 76 can discharge the process gas 54 at different angles or the same angles.

All firing dishes 42 and the material 12 in the process space 20 are largely homogeneously supplied and treated with process gas 54 as a result of the nozzle arrangement 76 of the injection device 56, so that the thermal treatment of the material 12 in all firing dishes 42 proceeds highly reproducibly and uniformly.

On the one hand, process gas 54 arrives in this way at the process position on the material 12, while secondly the offgas 46, in the present case water ($H_2O$) or carbon dioxide ($CO_2$), formed is displaced by the process gas 54, as a result of which the offgas 46 can be effectively extracted from the process space 20 by the extraction system 48.

The directed discharge of the process gas 54 alters the gas partial pressure in the immediate vicinity of the material 12, which in turn influences the process parameters and as a result influences the chemical and physical properties of the product formed.

Furthermore, the quality of the product obtained can be increased and reject production can be reduced in this way. Furthermore, process gas 54 can be saved.

The directed discharge of process gas 54 from the injection nozzles 76a also makes it possible to influence the temperature in the vicinity of the material 12 to be treated; both homogenization of the temperature in the vicinity of the material 12 and also a targeted heterogeneous temperature profile at the material 12 can be brought about, e.g. when the distance through the heat exchanger 64 is deliberately insufficient to heat the process gas 54 to the temperature of the process space atmosphere 66. These effects can be brought about both by appropriate prior conditioning of the process gas 54 through the process gas system 52 and also by appropriate release of the process gas 54 by means of the injection device 56.

The discharge of the process gas 54 through the injection device 56 can occur continuously or in pulses; this is set by means of an appropriate control and appropriate control means in the process gas system 52.

FIGS. 2a, 2b and 2c show injection devices 56 with differently configured or arranged heat exchangers 64, in which the injection nozzles 76a of the nozzle arrangement 76 are, as in FIG. 1, each arranged next to the transport track 32 along a vertical direction. However, the invention also encompasses an arrangement of the injection nozzles 76a which includes an angle different from 90° with the top 16b and/or the vertical sidewalls 16c, 16d.

FIG. 2a shows, as mentioned above, a variant with the injection device 56 of FIG. 3a. In the working example depicted in FIG. 2b, the heat exchanger 64 runs close to the top 16b of the furnace 10 transverse to the transport direction 30 in order to utilize the regions of the process space atmosphere 66 having a very high heat content for heating the process gas 54. The nozzle arrangement 76 there projects vertically down from the heat exchanger 64 running along the top 16b of the furnace 10. FIG. 2c shows an alternative arrangement of the heat exchanger 64 parallel to the transport direction 30 in one variant on the vertical sidewall 16c.

Figures 4A, 4B:
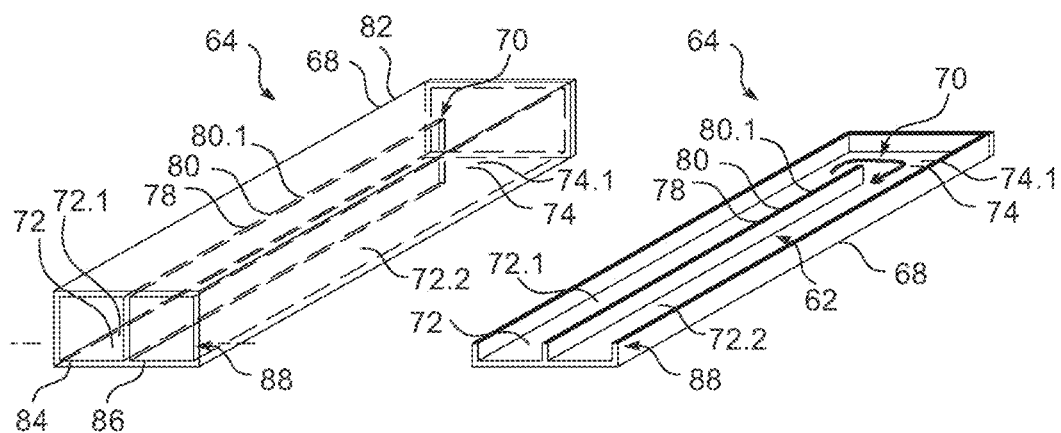
FIGS. 4a and 4b a perspective view of a first working example of the heat exchanger according to the invention.
Figures 5A, 5B:
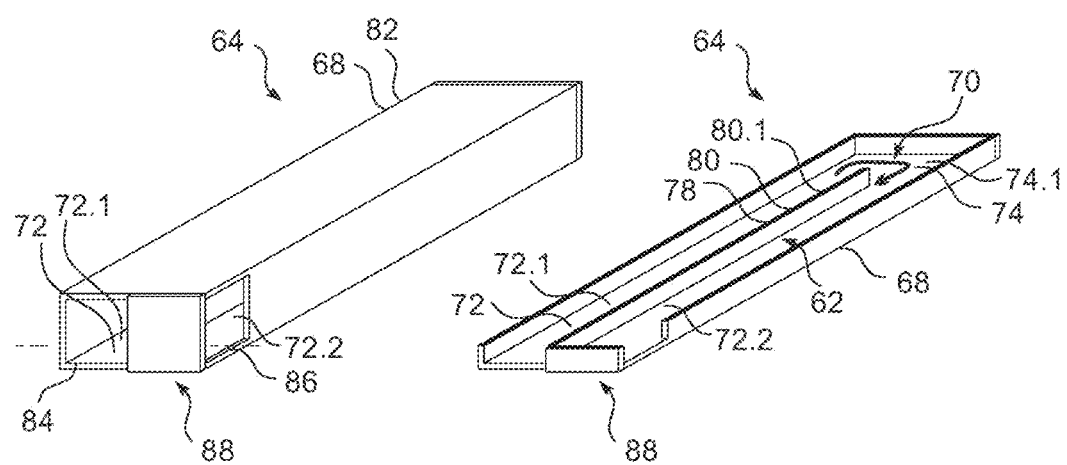
FIGS. 5a and 5b a perspective view of a second working example of a heat exchanger according to the invention.

FIGS. 4a, 4b show a first working example and FIGS. 5a and 5b show a second working example of the heat exchanger 64 of the injection device 56, in which two flow channels 72.1 and 72.2 which are connected by the diversion region 72.1 are present in each case. The two flow channels 72.1 and 72.2 and the diversion region 74.1 in the HE housing 68 are formed by a flow guide element 78 which acts as a type of dividing bulkhead 80, so that the channel arrangement 70 with the first flow channel 72.1, the diversion region 74.1 and the second flow channel 72.2 is formed by a housing outer wall 82 of the HE housing 68 and the flow guide element 78.

In this way, the distance covered by the process gas 54 within the heat exchanger 64 in the injection device 56 is increased compared to a direct flow path to the outlets 60. Preferably, and as depicted in FIGS. 3a to 10b, the distance covered in the heat exchanger 64 in the injection device 56 is at least twice as long as in the case of heat exchangers 64 without one or more diversion regions 74 or one or more guide bulkheads 80. This is intended to ensure that the process gas 54 covers a very long distance within the heat exchanger 64 in order to maximize the input of heat energy to be taken up before the outlet 60 is reached. In modifications not shown individually, a plurality of dividing bulkheads 80 can be arranged transversely to the longitudinal direction, for example in a zig-zag arrangement or alternately on opposite longitudinal sides of the housing outer wall 82 of the heat exchanger 64. However, the invention also encompasses heat exchangers 64 in which the distance covered by the process gas 54 within the heat exchanger 64 is not at least twice as long as without one or more guide bulkheads 80.

In a further working example which is not shown, a plurality of guide bulkheads 80 are arranged in such a way that turbulent flow composed of a plurality of main eddies of the process gas flow is obtained through the heat exchanger 64.

In the working examples shown in FIGS. 4a to 5b, there is an inlet 84 and an outlet 86 of the heat exchanger 64 at a common connecting end 88 of the heat exchanger 64. In the working example of FIGS. 4a, 4b, the inflow direction of the process gas 54 into the heat exchanger 64 is parallel but counter to its outflow direction from the heat exchanger 64.

Figures 6A, 6B:
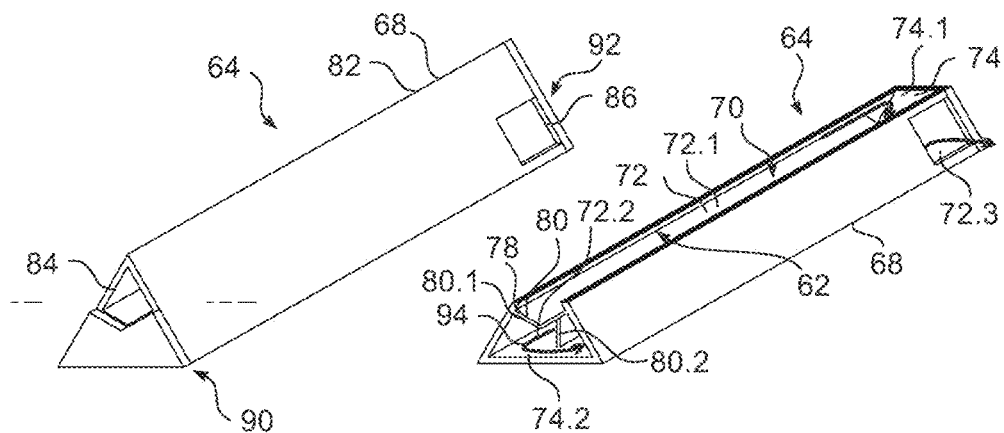
FIGS. 6a and 6b a perspective view of a third working example of the heat exchanger.

In the working example shown in FIGS. 5a and 5b, the outlet 86 of the heat exchanger 64 is configured at the connecting end in such a way that the process gas 54 flows out from the heat exchanger 64 in a direction perpendicular to the inflow direction. In the working example of the heat exchanger 64 with three flow channels 72.1, 72.2 and 72.3 and two diversion regions 74.1 and 74.2 as shown in FIGS. 6a and 6b, the HE housing 68 is configured by way of example as elongated prism having the cross section of an equilateral triangle.

The three flow channels 72.1, 72.2, 72.3 and the two diversion regions 74.1, 74.2 are formed by means of three elongated dividing bulkheads 80.1, 80.2 and 80.3 which are arranged, in cross section, in a star-like manner with an angle of 120° around a common contact line. In this way, two of the dividing bulkheads, namely the dividing bulkheads 80.1, 80.2, the dividing bulkheads 80.2, 80.3 and the dividing bulkheads 80.3, 80.1 in each case and also in each case the housing outer wall 82 of the HE housing 68 form the flow channels 72.1, 72.2 and 72.3, respectively.

In this variant, each flow channel 72.1, 72.2, 72.3 lies in a plane which is offset relative to a reference plane $E_S$ which is in each case defined by the two other flow channels 72.2 and 72.3, 72.1 and 72.3 or 72.1 and 72.2. This is explained further below in connection with the FIGS. 8a, 8b and 8c for the example of FIG. 8a.

In the case of these three flow channels 72, the inlet 84 and the outlet 86 of the heat exchanger 64 are arranged at opposite ends of the HE housing 68, so that in each case an inlet end 90 and an outlet end 92 of the heat exchanger 64 are formed there.

Figures 7A, 7B:
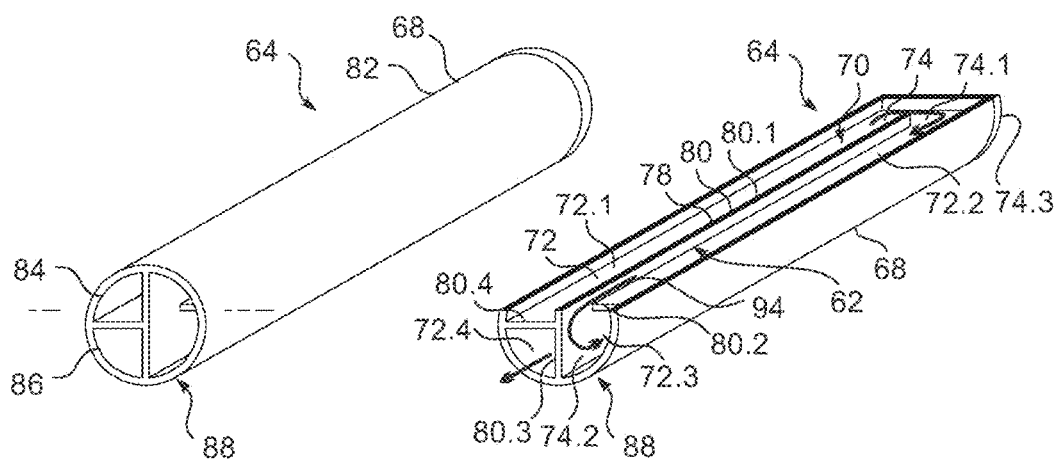
FIGS. 7a and 7b a perspective view of a fourth working example of the heat exchanger.

In the working example of the heat exchanger 64 shown in FIGS. 7a and 7b, four flow channels 72.1, 72.2, 72.3 and 72.4 and also three diversion regions 74 are formed by four dividing bulkheads 80.1, 80.2, 80.3 and 80.4, with only the second and third diversion regions 74.2 and 74.3 being able to be seen. In the third diversion region 74.3, the HE housing is shown in open view. The HE housing 68 is, by way of example, configured as elongated tube having a circular cross section.

In this configuration of four flow channels 72, the inlet 84 and the outlet 86 of the heat exchanger 64 are again arranged at a common connecting end 88.

In modifications which are not shown individually, the channel arrangement 70 comprises one or more further flow channels 72 and in each case a diversion region 74 before each flow channel 72, so that the process gas 64 flows with different main flow directions through two successive flow channels 72.

It is common to all working examples of the heat exchanger 64 having at least three flow channels 72 that least the three flow channels 72 dictate a meandering flow path 94. This meandering flow path 94 can extend over one or more parallel planes.

Figure 8A:
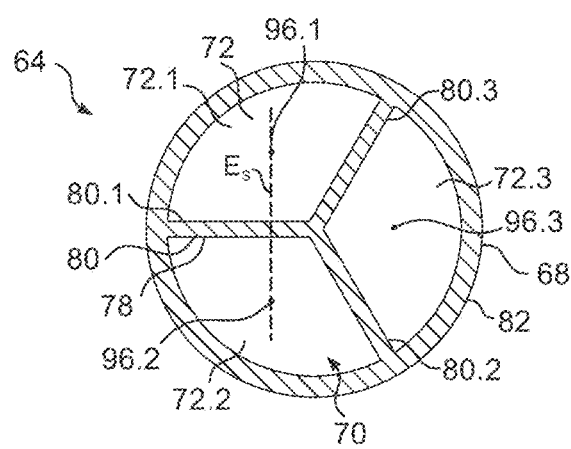
FIGS. 8a to 8c cross sections of three further working examples of the heat exchanger.
Figure 8B:
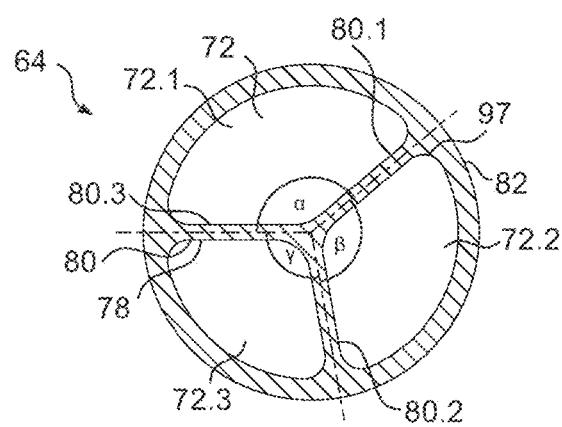
Figure 8C:
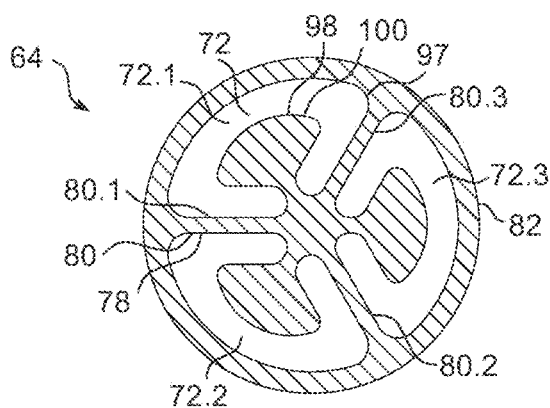

FIGS. 8a to 8c show variants of the heat exchanger 64 in which the HE housing is, as in the working example of FIG. 7, configured as elongated tube having a circular cross section, but in which three flow channels 72.1, 72.2 and 72.3 are again in each case arranged offset relative to one another, as is the case in the working example of FIG. 6.

One of the abovementioned planes $E_S$ is fixed between two geometric centers of gravity 96.1 and 96.2 of the cross sections of the flow channels 72.1 and 72.2, as is illustrated in FIG. 8a, with the plane $E_S$ there being perpendicular to the plane of the paper. The third geometric center of gravity 96.3 of the third flow channel 72.3 is offset relative to this plane $E_S$, as has been indicated above.

The cross sections of the flow channels 72.1, 72.2, 72.3 depicted in FIG. 8a have the shape of a sector of a circle defined by the dividing bulkheads 80.1, 80.2, which are planar in this working example, and the housing outer wall 82 of the HE housing 68. These flow channels 72.1, 72.2 and 72.3 having a cross section in the shape of a sector of a circle are, going out from the flow channel 72.1, rotated by the same angle of 120° around the midpoint M of the circular cross section of the HE housing 68.

The three dividing bulkheads 80.1, 80.2, 80.3 arranged along a common axis include the same or different tilt angles $\alpha$, $\beta$, $\gamma$ between one another; when the tilt angles are different, they are preferably $\alpha=100°$, $\beta=120°$ and $\gamma=140°$.

FIG. 8b shows a modified working example of the heat exchanger 64 in cross section. The cross sections of the flow channels 72.1, 72.2, 72.3 here have rounded corners 97 and different cross-sectional areas.

FIG. 8c illustrates core structures 98 which are present in the flow channels 72.1, 72.2, 73.3 and in this working example are provided by core bodies 100. These core structures 98 increase the area of the heat exchanger 64 which participates in heat transfer and with which the process gas 54 which can be passed through interacts thermally during passage through the heat exchanger, compared to the heat exchanger 64 without core structures 98. In addition, the flow channel cross section through which the process gas 54 can flow is reduced relative thereto, as a result of which the process gas 54 can flow at a greater flow velocity through the heat exchanger 64 and the proportion by volume of the process gas 54 which comes into direct contact with the heat-transferring surface is increased. A higher flow velocity additionally increases the efficiency of heat transfer.

Figures 9A, 9B:
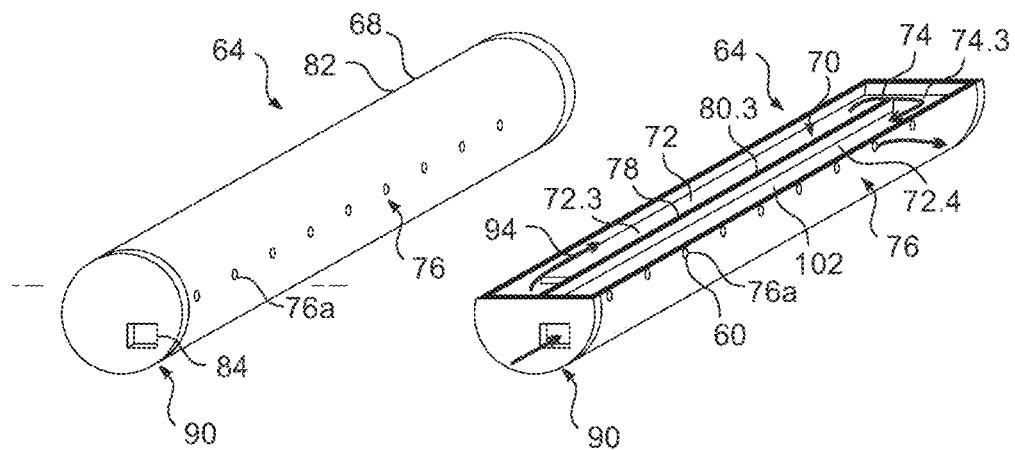
FIGS. 9a and 9b a perspective view of an eighth working example of the heat exchanger.

FIGS. 9a and 9b show a working example in which the nozzle arrangement 76 is encompassed by the heat exchanger 64. For this purpose, the injection nozzles 76a of the nozzle arrangement 76 are integrated into the housing outer wall 82 of the HE housing 68. As depicted, the third flow channel 72.3 present here opens into a distributor channel 102 via which the process gas gets to the injection nozzles 76. The injection nozzles 76 can, in a single embodiment, be through-openings in the HE housing 68. The distributor channel 102 can also act as part of the heat exchanger 64 and in this case define a fourth flow channel 72.4 of the heat exchanger 64 into which the process gas 54 flows via a third diversion region 74.4 located upstream, in addition to its function as distributor channel.

Figures 10A, 10B:
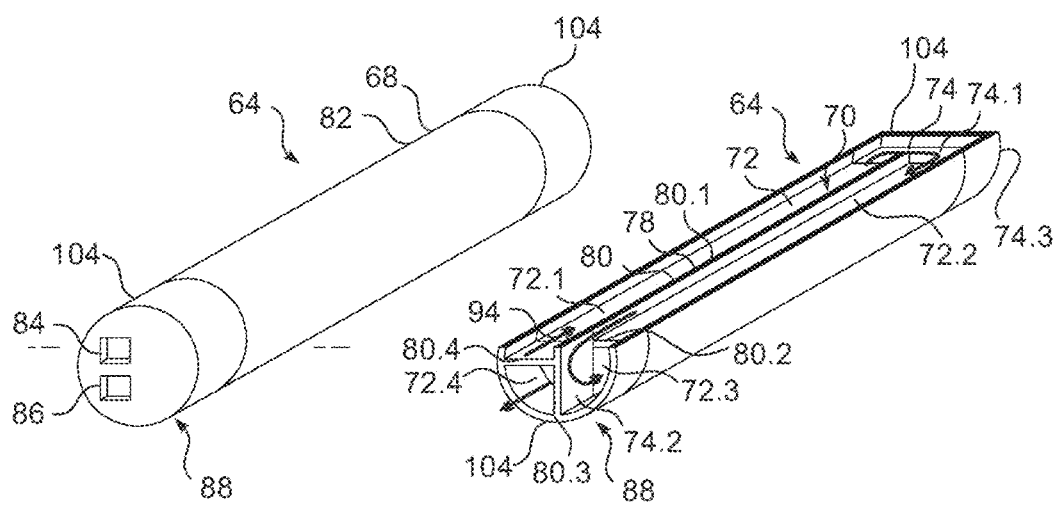
FIGS. 10a and 10b a perspective view of a ninth working example of the heat exchanger.

To simplify the manufacture of the heat exchanger 64, the HE housing 68 has housing caps 104 which can be installed at its opposite end faces in the working example shown in FIGS. 10a and 10b. These housing caps can provide part of the channel arrangement 70 and of the HE housing 68. The housing caps 104 here provide the diversion regions 74 and can also have one or more inlets 58 and/or one or more outlets 60. The heat exchanger 64 can thus be produced in individual parts and be completed only during assembly by installation of the housing caps 104.

In a further variant, which is not shown individually, the channel arrangement 70 in the HE housing 68 is formed by inserting a separate flow guide structure into the HE housing 68 and fastening it there. In this case, the flow guide structure can be fastened detachably so that it can be replaced by another flow guide structure when required, for example if it is found that the channel arrangement formed by the flow guide structure used is not sufficient for heating the process gas 54 to the temperature of the process space atmosphere 66.

The above-described designs with the housing caps 104 or an insertable and optionally exchangeable flow guide structure can be implemented in all the abovementioned working examples.

According to the invention, the heat exchanger housing 68, the dividing bulkheads 80.1, 80.2, 80.3, the core structures 98 and/or the housing caps 104 are made of one or more materials which has/have a specific thermal conductivity of $\lambda \geq 50$ $Wm^{-1}K^{-1}$, $\lambda \geq 75$ $Wm^{-1}K^{-1}$ or $\lambda \geq 100$ $Wm^{-1}K^{-1}$. Materials having a metal content, for example elemental metals, metal alloys, metal oxides, metal nitrides or metal carbides are particularly useful for this purpose. Illustrative metals which may be mentioned are copper (Cu), tin (Sb), zinc (Zn), silver (Ag), magnesium (Mg), nickel (Ni), beryllium (Be), aluminum (Al), potassium (K), molybdenum (Mo), tungsten (W), sodium (Na), iron (Fe), silicon (Si) and tantalum (Ta).

What is claimed is:

1. An injection device for supplying a gas to a material to be calcined, the injection device comprising:
   a) a heat exchanger housing;
   b) at least one inlet into the injection device and through which the gas can be fed to the injection device and at least one outlet from the injection device through which the gas can be supplied from the injection device, wherein the at least one inlet and the at least one outlet are connected to one another by a flow path for the gas; wherein
   c) the flow path extends through a heat exchanger within the heat exchanger housing, which is accessible to an ambient atmosphere from the outside and in which a channel arrangement is accommodated;
   d) the channel arrangement comprises at least a first flow channel and a second flow channel between which a diversion region is formed in such a way that the gas can flow with different main flow directions through the first and second flow channels; and
   e) the first and second flow channels and the diversion region in the heat exchanger housing are formed by a flow guide element so that the channel arrangement with the first flow channel, the diversion region, and the second flow channel is formed by a housing outer wall of the heat exchanger housing and the flow guide element.

2. The injection device of claim 1, wherein a core structure is present in at least one or more of the first and second flow channels, and wherein the core structure has a shape configured to increase the heat exchange surface area within the one or more flow channels.

3. The injection device of claim 1, wherein at least the first and second flow channels run parallel to one another.

4. The injection device of claim 1, wherein the heat exchanger and/or at least one or more of the first and second flow channels have, at least in sections, a cross section, which is circular, elliptical, has the shape of a segment of a circle, has the shape of a sector of a circle, is polygonal, is triangular, is a quadrilateral, is trapeze-shaped, is trapezoidal, is rectangular, is pentagonal, is hexagonal, or has more than six sides.

5. The injection device of claim 1, wherein at least one or more of the first and second flow channels have, at least in sections, changing cross sections in the respective main flow direction.

6. The injection device of claim 1, wherein the heat exchanger housing and walls of at least the first and second flow channels present therein are composed of one or more housing materials, which have a specific thermal conductivity of $\lambda \geq 50$ $Wm^{-1}K^{-1}$.

7. The injection device of claim 1, wherein the flow guide element of the channel arrangement is at least partly formed by a flow guide structure inserted into the heat exchanger housing and fastened detachably therein.

8. The injection device of claim 1, wherein the heat exchanger housing comprises at least one housing cap, which provides part of the channel arrangement.

9. The injection device of claim 8, wherein the housing cap has at least one inlet through which the gas can be fed to the heat exchanger and/or an outlet through which the gas can flow out from the heat exchanger.

10. The injection device of claim 1, wherein the at least one outlet of the injection device comprises a nozzle arrangement having one or more injection nozzles by which the gas can be supplied in a direction toward the material to be calcined.

11. The injection device of claim 10, wherein the nozzle arrangement is encompassed by the heat exchanger.

12. The injection device of claim 1, wherein the channel arrangement has a third flow channel, with a second diversion region being formed between the third and second flow channels in such a way that the gas can flow with different main flow directions through the second and third flow channels.

13. The injection device of claim 12, wherein the first, second, and third flow channels dictate a meandering flow path.

14. The injection device of claim 12, wherein the first and second flow channels, the first and third flow channels, or the second and third flow channels define a common plane and the third or the second or the first flow channel is offset relative to the common plane or is arranged at an angle thereto.

15. The injection device of claim 12, wherein the channel arrangement comprises one or more further flow channels and in each case a diversion region in front of each further flow channel so that the gas can flow with different main flow directions through two successive flow channels.

16. The injection device of claim 1, wherein the gas is a process gas and wherein the material is a battery cathode material.

17. The injection device of claim 6, wherein the one or more housing materials have a specific thermal conductivity of $\lambda \geq 75$ $Wm^{-1}K^{-1}$.

18. The injection device of claim 17, wherein the one or more housing materials have a specific thermal conductivity of $\lambda \geq 100$ $Wm^{-1}K^{-1}$.

19. The injection device of claim 12, wherein the first, second, and third flow channels dictate a meandering flow path, and wherein the first and second flow channels, the first and third flow channels, or the second and third flow channels define a common plane and the third or the second or the first flow channel is offset relative to the common plane or is arranged at an angle thereto.

20. A process gas system for introducing a process gas for a thermal or thermochemical treatment of a material into a process space, wherein the process gas system comprises at least one injection device of claim 1.

21. An apparatus for the thermal or thermochemical treatment of a material, the apparatus comprising:
 a) a housing;
 b) a process space present in the housing;
 c) a transport system by which the material or carrier structures laden with the material can be transported in a transport direction through the process space;
 d) a heating system by means of which a process space atmosphere prevailing in the process space can be heated;
 e) a process gas system by means of which a process gas, which is necessary for the thermal or thermochemical treatment of the material can be fed into the process space,
 wherein
 f) the process gas system includes at least one injection device and the process gas can be supplied in a targeted manner by means of the at least one injection device to the material or to the carrier structures laden with the material, the injection device including
  f(i)) a heat exchanger housing,
  f(ii)) at least one inlet through which the process gas can be fed to the at least one injection device and at least one outlet through which the process gas can be supplied from the at least one injection device, the at least one inlet and the at least one outlet connected to one another by a flow path for the process gas, and
  f(iii) wherein the flow path extends through a heat exchanger within the heat exchanger housing that is accessible to the process space atmosphere within the process space, including the process gas, from the outside and in which a channel arrangement is accommodated;
 g) the at least one injection device is arranged in such a way that the process space atmosphere can flow around and/or radiate heat onto the heat exchanger housing so that the process gas can be passively heated;
 h) the channel arrangement includes a first flow channel and a second flow channel and includes a diversion region formed therebetween in such a way that the process gas can flow with different main flow directions through the first and second flow channels; and
 i) the first and second flow channels and the diversion region in the heat exchanger housing are formed by a flow guide element so that the channel arrangement with the first flow channel, the diversion region, and the second flow channel is formed by a housing outer wall of the heat exchanger housing and the flow guide element.

22. A process for thermal or thermochemical treatment of a material in which:
 a) the material or carrier structures laden with the material are conveyed through the process space of the apparatus of claim 21 for the thermal treatment of the material;
 b) the process space atmosphere prevailing in the process space is heated; and
 c) the process gas, which is necessary for the thermal or thermochemical treatment, is introduced into the process space,
 wherein
 d) the process gas is heated by means of the heat exchanger, which is arranged in the process space.

23. The process of claim 22, wherein the process gas is introduced into the process space with a temperature, which corresponds essentially to the temperature of the process space atmosphere.

24. An injection device for supplying a gas to a material to be calcined, the injection device comprising:
 a) a heat exchanger;
 b) at least one inlet into the injection device and through which the gas can be fed to the injection device and outlets from the injection device through which the gas can be supplied from the injection device, wherein the at least one inlet and the outlets are connected to one another by a flow path for the gas;
 wherein
 c) the flow path extends through a heat exchanger within the heat exchanger housing, which is accessible to an ambient atmosphere from the outside and in which a channel arrangement is accommodated;
 d) the channel arrangement comprises a first flow channel and a second flow channel between which a diversion region is formed in such a way that the gas can flow with different main flow directions through the first and second flow channels;
 e) a core structure is present in one or more flow channels, the core structure having a shape configured to increase the heat exchange surface area within the one or more flow channels; and
 f) the ambient atmosphere includes the gas having been supplied from the injection device.

25. An injection device for supplying a gas to a material to be calcined, the injection device comprising:
 a) at least one inlet through which the gas can be fed to the injection device and at least one outlet through which the gas can be supplied from the injection device, which are connected to one another by a flow path for the gas;
 wherein
 b) the flow path has a heat exchanger having a heat exchanger housing, which is accessible to an ambient atmosphere from the outside and in which a channel arrangement is accommodated;
 c) the channel arrangement comprises a first flow channel and a second flow channel between which a diversion region is formed in such a way that the gas can flow with different main flow directions through the first and second flow channels;
 d) the channel arrangement is at least partly formed by a flow guide structure inserted into the heat exchanger housing and fastened detachably therein and forming the first and second flow channels; and e) the first and second flow channels and the diversion region in the heat exchanger housing are formed by the flow guide structure so that the channel arrangement with the first flow channel, the diversion region, and the second flow channel is formed by a housing outer wall of the heat exchanger housing and the flow guide structure.

\* \* \* \* \*